No. 618,177. Patented Jan. 24, 1899.
R. KUNZ, Sr.
AUTOMATIC SAFETY STOP FOR ENGINES.
(Application filed Nov. 4, 1898.)
(No Model.)
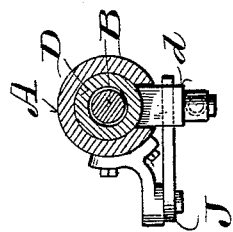
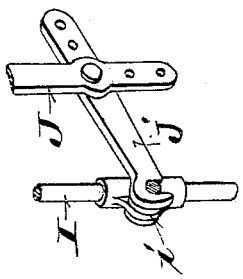
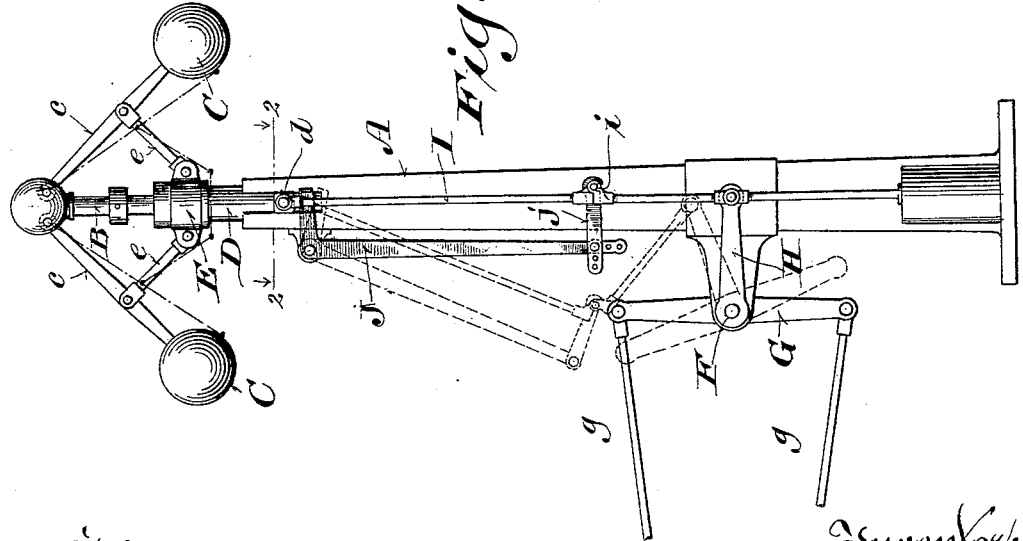
Witnesses:
Geo. W. Young.
Chas. L. Goss.
Inventor:
Reinhard Kunz Sr.,
By Whittle Hondus Smith Bothun & Lee
Attorneys.

UNITED STATES PATENT OFFICE.

REINHARD KUNZ, SR., OF MILWAUKEE, WISCONSIN.

AUTOMATIC SAFETY-STOP FOR ENGINES.

SPECIFICATION forming part of Letters Patent No. 618,177, dated January 24, 1899.

Application filed November 4, 1898. Serial No. 695,423. (No model.)

*To all whom it may concern:*

Be it known that I, REINHARD KUNZ, Sr., a citizen of the United States, residing at Milwaukee, in the county of Milwaukee and State of Wisconsin, have invented certain new and useful Improvements in Automatic Safety-Stops for Steam-Engines, of which the following is a specification, reference being had to the accompanying drawings, forming a part thereof.

This invention relates particularly to automatic-cut-off engines. Its main object is to prevent the running away of engines and the resulting accidents in case the governor-belts break or slip or from any cause the governors come to rest while the engines are running.

It consists of certain novel features of construction and arrangements and combinations of parts, as hereinafter particularly described and claimed.

In the accompanying drawings like letters designate the same parts in the several figures.

Figure 1 is a side elevation of a centrifugal governor and its connections embodying my invention. Fig. 2 is an enlarged cross-section on the line 2 2, Fig. 1; and Fig. 3 is a detail view in perspective, showing the detachable connection between the jointed governor-rod and the lever by which it is bent when the governor-balls fall.

A designates the stand of an ordinary centrifugal governor, B the vertical spindle which turns in said stand and with the upper end of which the governor-balls C C are connected by arms *c c*, and D a sleeve movable vertically on the spindle B and connected by a collar E, which turns thereon, and by links *e e* with the arms *c c*.

F is a rock-shaft having a horizontally-disposed bearing in a bracket on the lower part of the stand A. It is provided at one end with a vertically-disposed cross-arm G, which is connected in the usual way by rods *g* with the cut-off cams, which it is not deemed necessary to show. A horizontally-disposed lever-arm H is fixed upon the other end of said rock-shaft and is connected by a rod I with a stud or arm *d*, projecting horizontally from the sleeve D through a vertical slot in the upper end of the governor-stand. This rod I is made in two parts or sections, which are connected with each other by a rule-joint *i*, which enables said rod to be bent in one direction only from a straight line.

J is a bell-crank or angular lever fulcrumed at its elbow to a bracket on the upper part of the governor-stand and having its shorter arm extending horizontally underneath the stud or arm *d* and its longer depending arm connected by a link *j* with the joint *i* of the rod I. This link *j* is preferably hooked, as shown in Fig. 3, so that it may be readily engaged with and disengaged from the pivot-pin of the joint *i* for the purpose of starting the engine, as hereinafter explained.

As is well understood by those familiar with the class of engines to which my improved safety-stop is applicable, an increase of speed, tending to raise and separate the governor-balls, lifts the sleeve D and, acting through the rod I in the usual way, turns the arm H upwardly, thus shifting the cut-off cams, so that they will cause the hooks of the valve-gear to release the steam-valves and allow the latter to close earlier in the stroke of the engine-piston. On the other hand, a decrease of speed tends to lower the governor-balls and in like manner, through the connections above mentioned, to shift the cut-off cams into position to cause a later closing of the steam-valves. The short arm of lever J is arranged below the lower limit of the normal travel or movement of the stud or arm *d* while the engine is running. The governor is driven in the usual way by a belt from the crank-shaft of the engine; but this driving connection, being the same that is ordinarily employed and being well understood, is not shown.

In case the belt breaks or slips or the governor stops from any other cause the balls immediately fall and the sleeve D, descending with them, carries the stud or arm *d* into engagement with the shorter arm of lever J, turning said lever into the position indicated by dotted lines in Fig. 1 and at the same time breaking the joint in and bending the rod I, which turns the cam-operating lever or arms into the position indicated by dotted lines and shifts the cut-off cams into positions in which they will prevent the opening of the steam-valves and will thus stop the engine.

It will be observed that the drop or fall of the governor-balls to their extreme lower position has the same effect practically on the cam-operating arms that would be produced by an extreme upward movement of the governor-balls. In the former case the arm H is turned upward by bending and thus in effect shortening the rod I, while in the latter case the arm H is turned upward by the elevation of the sleeve D.

To start the engine after it has been stopped in the manner above explained, the link or hook $j$ is detached from the rod I and the latter is then straightened. The engine being started and the governor put in motion through its driving connections, the link $j$ is hooked over the pivot-pin of the joint $i$ and the device is in readiness for operation whenever the occasion therefor may arise.

The joint $i$ is preferably so constructed that it will pass when moved away from the lever J slightly beyond a straight line, so as to prevent the accidental operation of the stop except when the occasion therefor occurs. In place, however, of the rule-joint an ordinary hinge or pivot joint that may be bent in both directions from a straight line may be substituted; but in that case a guide or stop must be provided on the governor-stand to hold the rod I in its normal working position.

The ends of the lever J and link $j$, which are connected with each other, are preferably formed with a number of holes, as shown, or the connection between said lever and the jointed rod I may be made adjustable otherwise, so that the stop mechanism may be adjusted for different loads, for engines of different sizes, or for other varying conditions. For a heavy load the link $j$ is lengthened, so as to lower the shorter arm of lever J and allow the governor-balls to descend a little farther without effect upon the stop mechanism. For a light load said link is correspondingly shortened, so as to raise the shorter arm of said lever, and thus cause the stop mechanism to operate earlier in case the governor stops.

Various other changes in the minor details of the device may be made without change in its mode of operation or departure from the principle of the invention.

I claim—

1. The combination with a governor having a jointed connecting-rod between the cam-operating lever and the balls, of an angular lever having one arm connected with said jointed rod and the other projecting into the path of a vertically-movable part of the governor, substantially as and for the purposes set forth.

2. An automatic safety-stop for steam-engines consisting in the combination with a centrifugal governor and a cam-operating lever, of a jointed rod connecting said lever with a vertically-movable part of the governor and an angular lever having one arm in the path of said vertically-movable part and the other arm detachably connected with said jointed rod, substantially as and for the purposes set forth.

3. The combination with an engine-governor having a jointed rod connecting a vertically-movable part of the governor with the cam-operating arm, of a lever constructed and arranged when the governor-balls fall to bend the joint in said rod and thereby prevent the opening of the steam-valves of the engine, substantially as and for the purposes set forth.

4. The combination with a centrifugal engine-governor connected with the cam-operating lever or arm by a rod having a rule-joint, of a lever constructed and arranged to bend and thus in effect shorten said rod when the governor-balls fall, substantially as and for the purposes set forth.

5. The combination with a centrifugal engine-governor and cam-operating arm connected by a rod having a rule-joint and capable of bending in one direction only from an approximately straight line, of a lever having a detachable connection with said jointed rod and constructed and arranged to bend said rod when the governor-balls fall, substantially as and for the purposes set forth.

6. The combination with a centrifugal engine-governor and a cam-operating lever connected by a jointed rod with a vertically-movable part of the governor, of a lever having an adjustable connection with said rod and adapted to bend the same when the governor stops, substantially as and for the purposes set forth.

In witness whereof I hereto affix my signature in presence of two witnesses.

REINHARD KUNZ, SR.

Witnesses:
 CHAS. L. GOSS,
 M. L. EMERY.